United States Patent [19]
Camilliere

[11] 3,746,247
[45] July 17, 1973

[54] ULTRACENTRIFUGE WITH ROTOR SPEED IDENTIFICATION

[75] Inventor: John Camilliere, Bloomingdale, N.J.

[73] Assignee: Electro-Nucleonics, Inc., Essex County, N.J.

[22] Filed: Dec. 23, 1970

[21] Appl. No.: 100,850

[52] U.S. Cl. .............................. 233/1 B, 318/313
[51] Int. Cl. ........................................... B01d 21/26
[58] Field of Search .................... 233/1 R, 23 R, 24, 233/19 R, 1 B; 318/340, 313; 307/117; 192/84 P, 103 R

[56] References Cited
UNITED STATES PATENTS

| | | | |
|---|---|---|---|
| 2,895,023 | 7/1959 | Blum................................. | 233/24 X |
| 2,955,753 | 10/1960 | O'Connor et al. ................ | 233/24 X |
| 3,101,322 | 8/1963 | Stallman et al. ...................... | 233/24 |
| 3,327,938 | 6/1967 | Stallman ........................... | 233/24 X |

Primary Examiner—Jordan Franklin
Assistant Examiner—George H. Krizmanich
Attorney—Henry T. Burke, P. E. Henninger, Lester W. Clark, Gerald W. Griffin, Thomas F. Moran, Howard J. Churchill, R. Bradlee Boal, Christopher C. Dunham and Robert Scobey

[57] ABSTRACT

Provisions are made for electronically identifying the maximum allowable speed of an ultracentrifuge rotor for the purpose of supplying the identification information to a rotor overspeed control to prevent spinning a rotor beyond its designed top speed. The top surface of the rotor carries a number of annular bands which may be either black or white. The color of the annular band in each band position is detected by means of an electronic circuit including a light source, a photocell detector, and a transistor switch for each band. Each transistor switch conducts when the annular band from which it receives reflected light is black, but does not conduct when the annular band is white. Each conducting switch puts out a steady voltage signal of different amplitude. The voltage output signals of the transistor switches are added to generate an analog control signal identifying the rotor by the color combination of its annular bands. If there are three annular band positions on the rotor, each being either black or white, there are eight possible values of the analog control signal representing eight different maximum allowable rotor speeds.

8 Claims, 6 Drawing Figures

Patented July 17, 1973
3,746,247
3 Sheets-Sheet 1
Fig. 1.
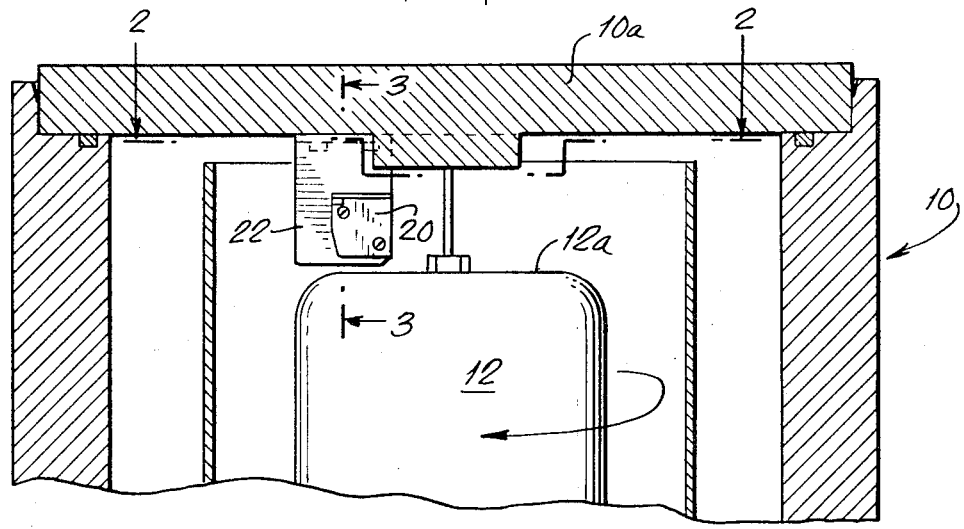
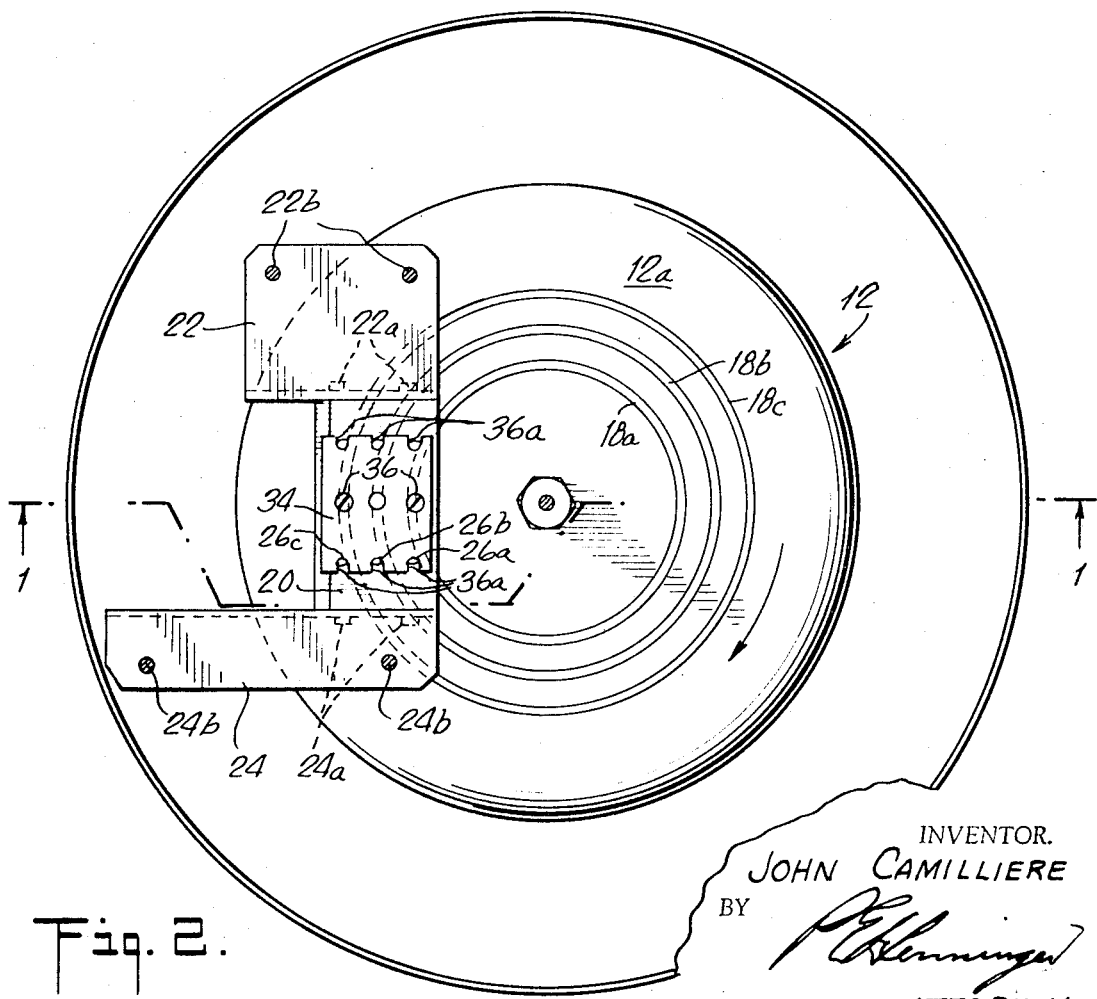
Fig. 2.
INVENTOR.
JOHN CAMILLIERE
BY
ATTORNEY

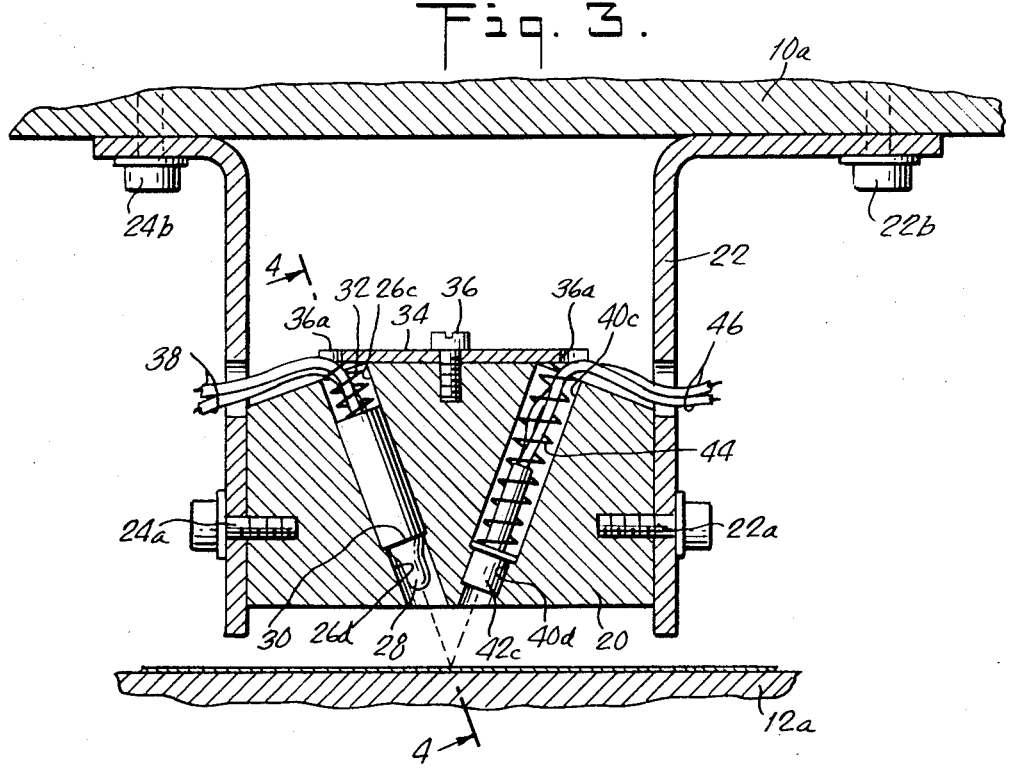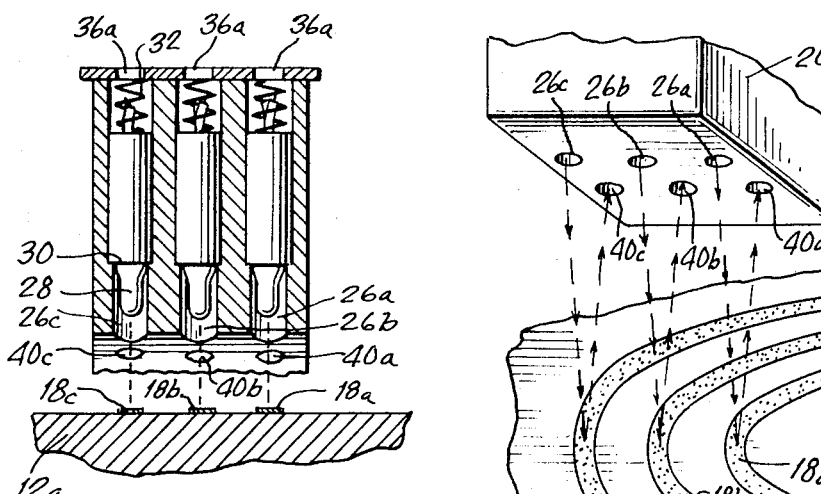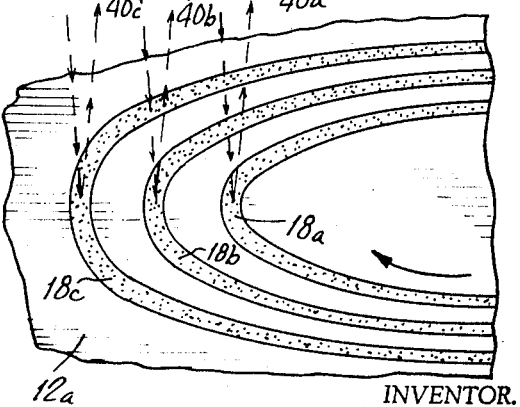

ULTRACENTRIFUGE WITH ROTOR SPEED IDENTIFICATION

BACKGROUND OF THE INVENTION

The invention is in the field of ultracentrifuge apparatus and particularly relates to controlling rotor speeds. In many ultracentrifuge uses the maximum speed of the rotor must be precisely and accurately controlled. In a given ultracentrifuge different rotors may be used interchangeably, with each rotor characterized by a different maximum allowable speed. A means for detecting, without human intervention, which rotor is in the ultracentrifuge and for automatically setting a conventional rotor overspeed control to the maximum allowable rotor speed is therefore desirable. It is desirable to identify the maximum allowable rotor speed whether the rotor is spinning or stationary.

One prior art method of identifying the maximum allowable speed of a rotor utilizes a disk affixed to the rotor and painted with alternate black and white stripes emanating radially from the rotor center of rotation. A photosensor is mounted above the disk to detect the ratio of black to white and to convert the ratio information into an analog control signal for setting an overspeed control. In this analog system the rotor must be spinning to get a proper reading; the reading from a stationary rotor is not meaningful. Variations in light intensity or photocell sensitivity can cause errors in the reading.

Another prior art method for identifying the maximum allowable speed of a particular rotor involves the use of a mechanical arm which contacts the rotor and detects its diameter, with the diameter reading representing an indication of the allowable top rotor speed. This method utilizes a system which is primarily mechanical and is therefore difficult to maintain and is limited in range.

SUMMARY OF THE INVENTION

The ultracentrifuge rotor speed identification system of this invention provides for accurate and unambiguous identification of both stationary and spinning rotors by decoding a plurality of annular bands arranged concentrically with the rotor axis of rotation and affixed to the rotor, each band being characterized by a reflection index of either a first or a second distinct value, together with an electronic circuit for detecting the type of band in each band position and for providing, on the basis of the detected information, a control signal for overspeed control. The circuit includes a light source for illuminating each of the annular bands and a photocell detector for each band, each photocell detector being exposed to light reflected from its annular band. The circuit further includes processing means connected to the photocell detectors for generating an overspeed control signal in the form of a voltage signal whose amplitude varies as a function of the combination of photocell detectors exposed to light reflected for annular bands having reflection index of one of the first and second values.

For example, if the annular bands are either black or white, and there are three band positions in the form of concentric rings about the axis of rotation of the rotor, there are eight possible combinations to be detected by the photocells because there are three variables of binary value. Given the same combination of bands the photocell detectors put out the same combination of signals whether the rotor is spinning or stationary. Reasonable variations in light intensity of the light source or of the sensitivity of the photocell detectors do not cause errors in reading because the output of the photocells is not analog but digital. The digital signal represented by the photocell detector resistivities is converted to an analog signal for controlling the overspeed control by means of a circuit including a transistor switch for each photocell detector which is responsive to the resistivity state of the detector, and a decoding circuit for decoding the outputs of the transistor switches.

BRIEF DESCRIPTION OF THE DRAWINGS

FIG. 1 is a schematic representation of the upper portion of an ultracentrifuge having a replaceable rotor, a stationary housing and a detector for detecting the top allowable speed of the rotor.

FIG. 2 is a sectional view along line 2—2 of FIG. 1.

FIG. 3 is a sectional view along line 3—3 of FIG. 1.

FIG. 4 is a sectional view along line 4—4 of FIG. 3.

FIG. 5 is a perspective detailed view of three annular bands affixed to the rotor and of a supporting structure for the detector.

DETAILED DESCRIPTION

Figure 6:
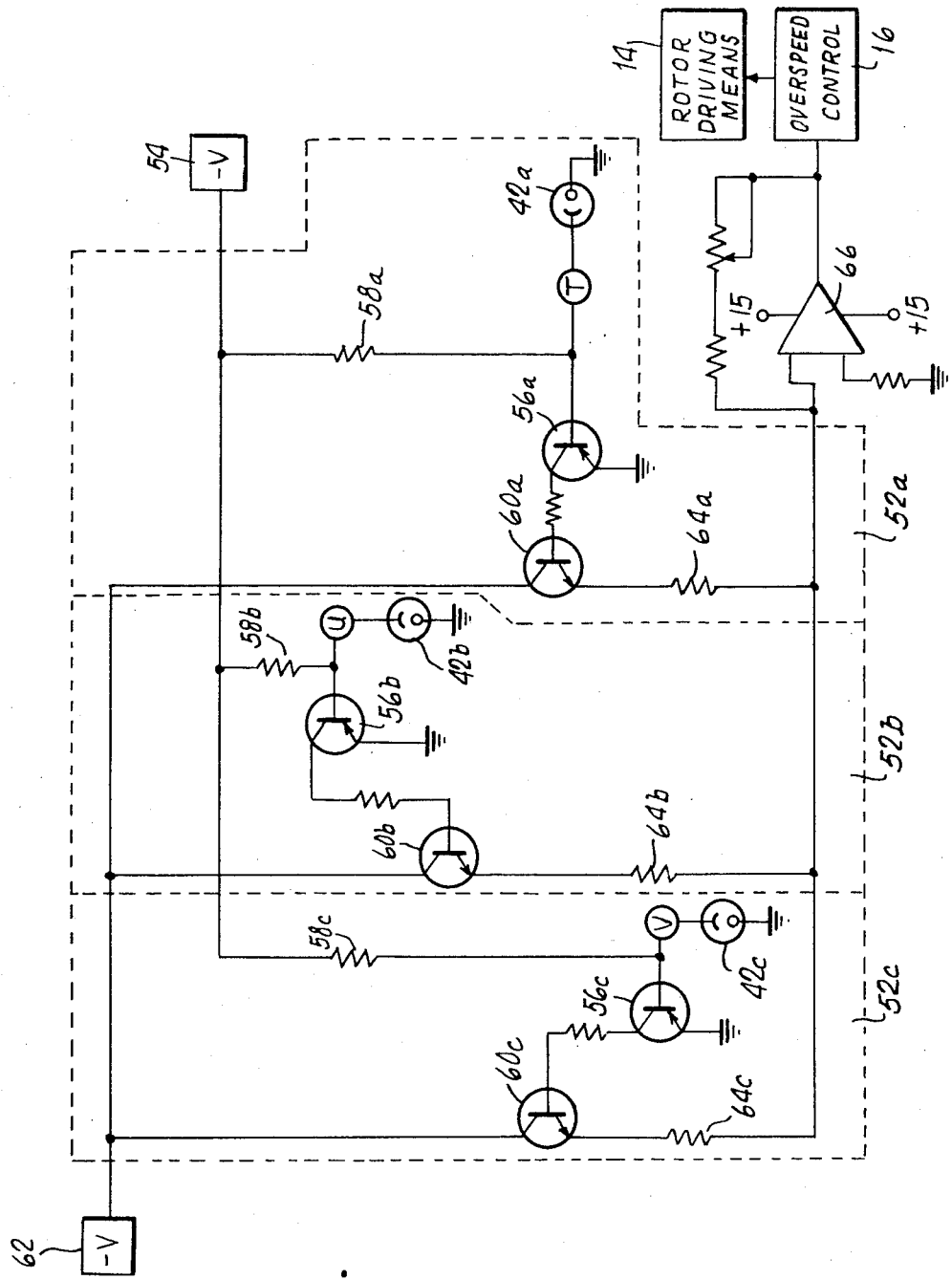
FIG. 6 is a schematic diagram of a circuit for converting the digitally coded output of a plurality of photocell detectors into an analog control signal.

A typical ultracentrifuge includes a stationary housing generally indicated at 10, a replaceable rotor generally indicated at 12, driving means to spin the rotor, and an overspeed control means for preventing rotor spinning above a preselected angular speed. The rotor driving means and the overspeed control are conventional elements and are indicated as labelled blocks 14 and 16 respectively in FIG. 6. Different rotors 12 may be inserted into the housing 10, and each different rotor 12 may have a different maximum allowable rotational speed. The overspeed control 16 must therefore be set to suit the particular rotor 12 which is to be spun by the rotor driving means 14.

For the purpose of identifying its maximum allowable speed, each rotor 12 is provided with a plurality of annular bands 18a, 18b and 18c which are positioned concentrically about the axis of rotation of the rotor 12 which is perpendicular to the plane of FIG. 2 and passing through the center of the rotor 12. Although three bands are shown in the example discussed herein, it should be understood that any other suitable number of bands may be used depending on the number of different maximum allowable rotational speeds which are to be identified. Each of the annular bands 18a, 18b, and 18c has a light reflection index of either a first or a second value. In a particular example, each of the bands may be either black or white. If the top surface 12a of the rotor 12 is originally colored black, then only white bands 18 need to painted or otherwise affixed to the top surface 12a.

The bands 18a, 18b and 18c may be of either one of two colors which have different indexes of reflection, or they may be of either one of two textures which have different reflection indexes. The fact that there are two possible indexes of reflection for each band gives the band a binary value. Thus, two bands can represent up to four combinations of indexes of reflection, three bands can represent up to eight combinations of indexes of reflection, etc.

The presence of an annular band of a particular index of reflection in a particluar band position is detected by a means including a box-shaped block 20 supported above the top surface 12a of the rotor 12 by means of two L-shaped brackets 22 and 24 affixed to opposing sides of the block 20 by means of bolts 22a and 24a threaded into the block 20. The upper portions of the brackets 22 and 24 are affixed to a top lid 10a of the ultracentrifuge housing 10 by means of bolts 22b and 24b threaded into the lid 10a. The block 20 is thus affixed to the stationary housing 10 of the ultracentrifuge and is held stationarily above the top surface 12a of the rotor 12. The rotor 12 may be removed in conventional manner by dropping it out of the housing 10, and it may be replaced by a new rotor 12 which may have different combinations of reflective indexes of its bands 18a, 18b, and 18c.

The block 20 is provided with a plurality of light source bores 26a, 26b and 26c which are in planes transverse to the radius of the rotor 12 and are oriented to point toward a radius of the top surface 12a of the rotor 12. Each of the light source bores 26a, 26b and 26c and contains a light 28 enclosed in a sleeve 30 retained against a narrowed lower portion of the bore by means of a spring. In reference to FIG. 3 showing the bore 26c, the sleeve 30 enclosing the light 28 is retained against the narrowed lower portion 26d of the bore 26c and is urged downwardly by means of a spring 32. The spring is retained by retaining a plate 34 affixed to the top surface 20a of the block 20 by bolts 36 threaded into the block 20. The edge of the plate 34 facing the bores 26a, 26b and 26c has comb-like cutouts 36a, 36b and 36c such that the top ends of the light source bores 26a, 26b and 26c are only partially covered by the plate 34 and wires 38 can run to the lights 28 for the purpose of supplying the lights with power.

For each of the light source bores 26a, 26b and 26c there is a corresponding photocell detector bore. Each of the photocell detector bores is in the same plane transverse to a radius of the rotor 12 as its corresponding light source bore. Referring to FIG. 3, a photocell detector bore 40c corresponds to the light source bore 26c and is in the same plane transverse to a radius of the rotor 12. The photocell detector bore 40c is shaped similarly to the light source bore 26c and has a narrowed lower portion 40d which retains a photocell detector 42 urged against the narrowed portion 40d by a spring 44. The edge of the retaining plate 34 on the side of the photocell detector bore 40c is shaped similarly to the edge toward the light source bore 26c and has similar cutouts 36a. The retaining plate 34 holds the spring 44 and allows the exit from the bore 40c of wires 46 which are connected to a transistor switch described later in this specification.

Referring specifically to FIGS. 3 and 5, it is seen that each pair of a light and a photocell detector are oriented in their respective bores such that they cooperate with a paticular one of the annular bands 18a, 18b and 18c. The light source bore 26c is oriented such that a beam of light 48c emanating from the light 28 in the light source bore 26c is directed to the annular band 18c and is reflected therefrom as reflected beam 50c. The orientations of the light source bore 26c and of the photocell detector bore 40c and the distance between the bores and the top surface 12a of the rotor 12 are such that the reflected beam 50c enters the photocell detector bore 40c and impinges on the photocell detector 42 retained therein. Similarly a light beam 48b originating at light source 26b is reflected from the annular band 18b and enters the photocell detector bore 40b as reflected beam 50b. A light beam 48a is generated in the light source bore 26a and, after reflection from the annular band 18a, enters the photocell detector bore 40a as reflected beam 50a.

It is evident that the intensity of the reflected beam 50c depends on the index of reflection of the annular band 18c; the intensity of the reflected beam 50b depends on the index of reflection of the annular band 18b; and the intensity of the reflected beam 50a depends on the index of reflection of the annular band 18a. If the index of reflection of each of the annular bands is either of a first value or of a second value, then the intensity of each reflected beam is either of a first value or of a second value. The intensity of each of the reflected beams 50a, 50b and 50c is thus a binary parameter and the intensity values of three beams can represent up to eight different combinations.

The intensity of each of the reflected beams 50a, 50b and 50c is detected by the circuit shown in FIG. 6 which includes transducer switches 52a, 52b and 52c, one associated with each of the transistor switches 52a, 52b and 52c, which include one of the photocell detectors 42a, 42b and 42c and serves to generate a zero voltage output signal when the photocell is illuminated by a reflected beam of high intensity, and a different voltage signal when the reflected beam is of low intensity. Thus, the transistor switch 52c includes the photocell detector 42c which is illuminated by the beam 50c reflected from the annular band 18c. When the index of reflection of the annular band 18c is low and the intensity of the reflected beam 50c is correspondingly low, the resistance of the photocell detector 42c is high. When the resistance of the photocell detector 42c is high, a PNP transistor 56c is biased by means of a biasing resistor 58c and a negative voltage source 54 such that it in turn biases an NPN transistor 60a to conduct current from a negative voltage source 62 across a weighting resistor 64a. The transistor switch 52b operates in a similar manner, with the base of a PNP transistor 56b connected to a voltage dividing network comprising a biasing resistor 58b and the photocell detector 42b connected between the negative voltage source 54 and ground, and with the base of an NPN transistor 60b connected to the collector of the PNP transistor 56b. When the light beam reflected from the annular band 18 illuminating the photocell detector 42b has low intensity, the resistance of the photocell detector 42b is high and the NPN transistor 60b is biased to conduct current from the negative voltage source 62 across a weighting resistor 64b. Similarly when the beam 50a reflected from the annular band 18a illuminating the photocell detector 42a has low intensity, then the resistance of the photocell detector 42a is high and an NPN transistor 60a is biased by means of a PNP transistor 56a to conduct current from the negative voltage source 62 across a weighting resistor 64a.

When the beam 50c reflected from the annular band 18c is of high intensity, then the resistance of the photocell detector 42c drops and the NPN transistor 60c stops conducting. Similarly when the resistance of the photocell detector 42 drops, the NPN transistor 60b stops conducting; and when the resistance of the photocell detector 42a drops, the NPN transistor 60a stops conducting.

The weighting resistors 64a, 64b, and 64c are connected as the input resistance to a conventional integrated decoding circuit 66. The weighting resistors 64a, 64b and 64c and the integrated circuit 66 are chosen such that the NPN transistor 60a (when conducting) contributes 0.5 volts to the output of the circuit 66; the NPN transistor 66b (when conducting) contributes 1.0 volts to the output of the circuit 66; and the NPN transistor 60c (when conducting) contributes 2.0 volts to the output of the circuit 66. This choice results in eight possible voltage levels at the output of the integrated circuit 66 differing from each other in steps of 0.5 volts. The possible combinations of conducting and nonconducting states of the transistors 60a, 60b and 60c and the voltage at the outputs of the integrated circuit 66 resulting from each combination are listed in the chart below in which the conducting state of the NPN transistors is designated by "on" and the nonconducting states are designated by "off":

| NPN transistor 60c | NPN transistor 60b | NPN transistor 60a | Output of integrated circuit 66 in volts |
|---|---|---|---|
| off | off | off | 0 |
| off | off | on | 0.5 |
| off | on | off | 1.0 |
| off | on | on | 1.5 |
| on | off | off | 2.0 |
| on | off | on | 2.5 |
| on | on | off | 3.0 |
| on | on | on | 3.5 |

In the table directly above the "off" state of a transistor corresponds to high reflection index of the annular band with which it is assciated and the "on" state of a transistor corresponds to a low reflection index of the annular band with which it is associated. For example, assume that each of the annular bands 18a, 18b and 18c is either black or white. Then if only the annular band 18a is white while annular bands 18b and 18c are black, only the transistor 60a of the transistor switch 52a is conducting and the voltage at the output of the integrated circuit 66 is 0.5 volts; if the annular bands 18a and 18b are white while the annular band 18c is black, then the output of the circuit 66 is 1.5 volts, etc.

The output of the integrated circuit 66 is connected to a conventional overspeed control 16 which prevents the rotor driving means 14 from spinning the rotor 12 at speeds above the maximum allowable speed for the rotor defined by the voltage level of the signal at the output of the circuit 66. For example, the overspeed control 16 may be set to prevent spinning the rotor 12 above 30,000 rpm when the voltage signal from the circuit 66 is 0.5 volts, to prevent spinning the rotor above 35,000 rpm when the voltage signal from the circuit 66 is 1 volt, etc.

In the embodiment described above, three annular bands are used to define one of eight possible rotor speeds. It should be clear, however, that the number of annular bands depends only on the number of possible rotor speeds that need be defined. Thus, two bands can be used if only up to four different speeds are to be defined, four bands can be used if up to 16 rotor speeds is to be defined, etc. The annular band should be of one of two possible indexes of reflection, and the provision of two possible reflection indexes can be achieved in any one of a number of possible manners. For example, the bands may be either black or white, or the top surface 12a of the rotor 12 may be of generally black background with only white bands, if any, affixed onto it, or an extra disk may be affixed to the top surface 12a of the rotor 12, with the disk having annular bands of either a first or a second index of reflection.

It is noted that in the embodiment described above, the rotor 12 is not contacted by the stationary portion of the means for determining its maximum allowable speed. It is also noted that the determination is independent of whether the rotor 12 is moving or stationary, because the index of reflection of each band is uniform around the circumference of the band and the reflected beam of light has the same intensity regardless of which portion of a particular band reflects it.

In recapitulation, the invention relates to an ultracentrifuge apparatus including a stationary housing generally indicated at 10, a replaceable rotor 12, driving means 14 to spin the rotor and an overspeed control 16 for preventing the rotor spinning means from imparting to the rotor speeds above a preselected limit. The improvement is in means for generating information indicative of the maximum allowable spin speed of the rotor 12 and for conveying the information to the overspeed control 16, and comprises a plurality of annular bands such as bands 18a, 18b and 18c arranged concentrically with the axis of rotation of the rotor 12 and affixed to the top surface 12 of the rotor, with each of the bands 18a, 18b and 18c characterized by a reflection index of either a first or a second value. As one example, the two distinct reflection index values may be defined by coloring the annular bands either black or white. A supporting means in the form of a block 20 supports a light source in the form of lights 28 and a plurality of photocell detectors such as detectors 42a, 42b and 42c. The block 20 has a plurality of light source bores 26a, 26b and 26c and a plurality of photocell detector bores 40a, 40b and 40c oriented in respect to and spaced from the rotor such that for each band there is a light 28 illuminating the band by a beam of light which beam is reflected and impinges as a reflected beam upon a photocell detector. A processing means comprising a plurality of transistor switches such as switches 52a, 52b and 52c is connected to the photocell detectors to generate a voltage signal whose amplitude varies as a function of the combination of photocell detectors exposed to light reflected from annular bands having reflection index of one of a first or second value.

I claim:

1. Ultracentrifuge apparatus including: a stationary housing, a replaceable rotor, driving means to spin the rotor, and an overspeed control means for preventing rotor spinning above a preselected angular speed; wherein the improvement is in means for generating information indicative of the maximum allowable spin speed of the rotor and for conveying said information to the overspeed control means, comprising:

a. a plurality of annular bands arranged concentrically with the rotor axis of rotation and affixed to the rotor, each band characterized by a reflection index of either a first or a second value, said values being distinct from each other;

b. a light source for illuminating each of the annular bands;

c. a plurality of photocell detectors, one photocell detector for each of the annular bands;

d. means for supporting the light source spaced from the rotor, and for supporting the photocell detectors spaced from the rotor, with each photocell detectors esposed to light reflected primarily by its annular band, the resistance of each photocell detector varying as the function of the amount of light reflected by its band; and e. processing means connected to said photocell detectors for generating a voltage signal whose amplitude varies as a function of the combinations of photocell detectors exposed to light reflected from annular bands having reflection index of one of said first and second values.

2. Apparatus as in claim 1 wherein annular bands characterized by a reflection index of the first value are white are and annular bands characterized by a reflection index of the second value are black , with the photocell detectors exposed to light reflected from white bands having lower resistance then that of photocell detectors exposed to light reflected from black bands.

3. Apparatus as in claim 2 wherein the annular bands form a part of the rotor surface and the rotor surface is black, except for white annular bands thereon.

4. Apparatus as in claim 1 wherein the supporting means comprises a block affixed to the ultracentrifuge housing and having a lower surface facing the annular bands on the rotor and having a plurality of light source bores each enclosing a light spaced inwardly from the lower surface of the block, each light source bore being oriented to direct light to a different annular band, said block also including a plurality of detector bores, each detector enclosing a photocell detector spaced inwardly from the lower surface of the block and being oriented to expose the enclosed detector to light reflected from a different annular band.

5. Apparatus as in claim 4 wherein the rotor has a relatively flat top surface and the annular bands form a part of the rotor top surface, the top rotor surface being black except for white bands, each of the annular bands being either black or white, with black bands being indistinct from the rotor top surface.

6. Apparatus as in claim 1 wherein the processing means comrpises a plurality of transistor switches, one transistor switch for each photocell detector, each switch comprising a circuit including a photocell detector and biased to conduct when the photocell detector has resistance defined by illumination by light reflected from a band having rflection index of said first value, and biased not to conduct when the photocell's resistance is defined by illumination by light reflected from a band having reflection index of said second value.

7. Apparatus as in claim 6 wherein the output of each conducting transistor switch is a steady voltage signal of a different preselected amplitude, and wherein means is provided for adding the voltage signal outputs of conducting transistor switches to generate an overspeed control signal, the amplitude of the common control signal being the sum of the steady voltage outputs signals of the conducting transistor switches.

8. Apparatus as in claim 7 including a first, a second and a third transistor switch, with the differences between the amplitudes of the first and the second, and between the second and the third transistor switches being the same.

* * * * *